Dec. 26, 1967   E. G. DI LORETO   3,360,314

BEARING CONSTRUCTION

Filed Feb. 15, 1966

INVENTOR
EDWARD G. DI LORETO
BY
*Jannwitz & Carr*
ATTORNEYS

United States Patent Office 3,360,314
Patented Dec. 26, 1967

3,360,314
BEARING CONSTRUCTION
Edward G. Di Loreto, 10923 Little Lake Road,
Downey, Calif. 90241
Filed Feb. 15, 1966, Ser. No. 527,428
8 Claims. (Cl. 308—191)

ABSTRACT OF THE DISCLOSURE

A bearing construction including two axially aligned members having outer end portions serving as inner races for groups of balls around them, the adjacent ends of the two members being arranged to provide a recess in one and an extension of the other fitted in the recess to hold the members together, one of the members at the end being slotted to permit a change in diameter upon assembly while the other has a continuous wall, the members having a continuous bore therethrough, and an axle shaft extending through the bore.

This invention pertains to an antifriction bearing, and more particularly to an arrangement for mounting a rotatable member on a bearing having an improved inner race assembly.

The bearing construction of this invention is particularly adapted for mounting roller skate wheels, such as used on skate boards, but is not limited to such purpose. Conventionally, wheels of this type are mounted on a threaded axle shaft by means of tapered inner races having threaded openings through the center which receive the shaft. In assembly, therefore, the necessary steps include the threading of the inner races on the shaft and properly positioning them so that the balls will be retained between the inner and outer races. This is a relatively slow operation, providing one of the major elements of cost in the construction of the wheel assemblies. Moreover, once the wheel has been assembled, it is possible later for the threaded inner races to become loosened on the shaft and separated axially. When this occurs, the bearing can come apart and the balls escape. The use of the individual threaded inner races also means that the bearing is made up of several somewhat complicated and expensive parts.

The present invention provides an improved bearing construction in which there is a two-piece inner race assembly that is snapped together. This fixes the inner races in precise alignment at an exact spacing. An end recess in one of the inner race members receives an end of the other when the assembly is completed. One of the interfitting members may be slotted to allow its diameter to change sufficiently so that it can subsequently spring back to enter the recessed portion in the mating part when the parts of the inner race are brought together. The two inner race members include aligned axial openings through which the axle shaft fits. The only threaded connnection need be that by a nut on the end of the axle shaft, with the axle shaft fitting through the two inner race members by a sliding fit. Thus, with the snapped together type assembly and the subsequent axial movement to receive the axle shaft, the bearing elements are secured together in a very short time. Moreover, when the slotted race member constitutes the male part of the assembly, once the axle shaft is in place, the slotted end portion cannot be compressed inwardly due to the interference that the axle shaft provides. Consequently, the male element cannot be reduced in thickness and cannot be withdrawn from the socket in the other portion of the inner race assembly. This assures that the bearing will not become separated in service. Thus, an improved more durable bearing is provided by this arrangement.

An object of this invention is to provide an improved ball bearing assembly.

Another object of this invention is to provide an improved inner race construction for ball bearings.

A further object of this invention is to provide a bearing assembly that can be put together in a minimum amount of time.

An additional object of this invention is to provide a bearing assembly that is trouble-free and will hold together under service conditions.

Yet another object of this invention is to provide a bearing arrangement made up of a minimum number of relatively simple parts.

These and other objects will become apparent from the following detailed description taken in connection with the accompanying drawing in which.

Figure 1:
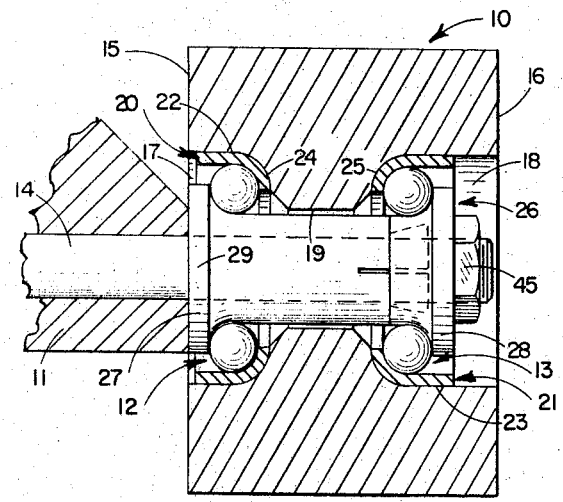
FIGURE 1 is a sectional view, partially in elevation, of a skate wheel mounted by the bearing of this invention.

With reference to the drawing, the arrangement of this invention is shown in FIGURE 1 as associated with a conventional skate wheel 10, such as is used for skate boards. Normally, for skate boards a pair of the wheels 10 is provided at the front and another pair at the rear. At each set, the wheels extend from either side of the supporting element 11 that is, in turn, attached to the undersurface of the board. A dual bearing construction is utilized for each wheel, including first and second sets of balls 12 and 13 that rotatably mount the wheel 10 on an axle shaft 14.

The inner and outer radial faces 15 and 16 of the wheel 10 are provided with recesses 17 and 18, respectively. These curve inwardly toward the axis of the wheel and connect to a central axial opening 19 through the wheel. Outer races 20 and 21 fit into the recesses 17 and 18 to provide the outer support for the balls 12 and 13. The outer races are curved to be substantially complementary to the contour of the balls, with outer annular circumferential portions 22 and 23 extending to arcuately inwardly directed flange sections 24 and 25. This provides a support for the balls 12 and 13, not only on their outer portions but also on the inner side portions of the balls where the two sets of balls are adjacent each other.

The inner race assembly 26 (see FIGURES 2 and 3) includes members 27 and 28 which are connected together in the completed bearing. The member 27 includes an enlarged outer end 29 tapering inwardly at a convex curved section 30 to a cylindrical portion 31. The curved section 30 has the same radius of curvature as the curved flange portion 24 of the outer race 20, and hence is substantially complementary to the periphery of the balls 12. At the end of the cylindrical portion 31 is a radial wall 32 from which extends an outwardly divergent end portion 33. The latter part of member 27 is substantially frustoconical, with its apical portion adjacent the end wall 32.

A cylindrical axial opening 34 extends through the member 27. A pair of longitudinally extending slots 35 extends inwardly from the end portion 33 past the radial wall 32 and into the cylindrical section 31.

The other race section 28 is considerably shorter than the member 27, having an enlarged portion 37 and a curved concave surface 38 extending to a short cylindrical portion 39 that terminates in a radial wall 40. The curved surface 38 is generally similar to the surface 30 of the member 27, and hence has substantially the same curvature as the outer race portion 25 with which it cooperates in the completed assembly. An undercut recess 41 extends inwardly of the member 28 from the radial end wall 40, this recess being outwardly flaring as it extends inwardly and generally complementary to the shape of the end section 33 of the member 27. Thus, the recess 41 is frustoconical, with the apical portion at the outer end of the recess where it joins the end wall 40. At the inner end of the recess 41 there is an axial opening 42 of smaller diameter than the inner portion of the recess so that a shoulder 43 is defined between them. The opening 42 is substantially the same diameter as that of the axial opening 34 in the member 27.

When the bearing is assembled, the members 27 and 28 are fastened together by introducing the end portion 33 of the member 27 into the socket opening 41 in the member 28. This is made possible by the slots 35 which permit the end section 33 to be compressed to a smaller thickness. Hence, it can enter the narrower outer portion of the recess 41 as the members 27 and 28 are slid axially together. Once it has entered the recess 41, the end portion 33 will spring outwardly along the outwardly flaring wall of the recess 41, assuming substantially its original contour. When it has entered the recess 41, the complementary tapering configuration of the end portion 33 and the recess prevent withdrawal of the section 33 from the recess, so that the parts 27 and 28 are held together.

Also, when the parts 27 and 28 are joined together, the radial end walls 32 and 40 are brought into abutment, and the cylindrical portions 31 and 39 form a continuous surface. The axial openings 34 and 42 likewise define a continuous axial passageway through the inner race assembly 26.

In assembly of the bearing, the member 27 is extended into the opening 19 in the wheel 10 with the balls 12 interposed between the surfaces 30 and 24. After this, the balls 13 are dropped into place and the member 28 fastened onto the end of the member 27. Next, the axle shaft 14 is slid axially through the opening 34 and its continuation at the opening 42 in the member 28. The nut 45 is threaded on the end of the axle and the bearing is complete. Thus, there is a minimum number of parts and the only threaded connection is between the nut 45 and the end of the axle. As a result, assembly is accomplished rapidly and easily. The inner race surfaces 30 and 38 are positioned a fixed distance apart and in an exact relationship with each other, so that the bearing races, in turn, necessarily will be correctly positioned with respect to the balls 12 and 13.

An additional advantage from this construction lies in the fact that once the axle shaft 14 has been extended through the openings 34 and 42, the inner race assembly 26 cannot be separated. This is because the end portion 33 cannot be compressed inwardly when the axle shaft 14 is in the way preventing such movement. Therefore, once the unit has been assembled, there is complete assurance that the inner races will not separate and that the balls will always be retained in position. This provides greater reliability than prior bearing constructions.

A single slot 35 on either side of the axial opening is adequate normally, but a cross slot in the end of the bearing member 27 also is possible. This permits greater reduction in size at the end 33 of the member 27 when it is to enter the recess 41. Consequently, the maximum diameter of the end 33 may be made larger where the cross slot allows contraction in two directions as the end 33 enters the socket.

Figure 4:
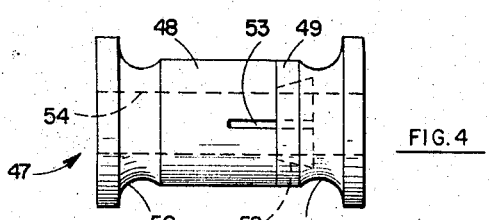
FIGURE 4 is a side elevational view of an inner race assembly providing full races for the bearings.

Certain modifications are possible in the design of this invention as seen, for example, in FIGURE 4. Here, the inner race assembly 47 is made up of two members 48 and 49 generally similar to the members 27 and 28 of the embodiment of FIGURES 1 and 2. However, the members 48 and 49 are provided with grooves 50 and 51, which form full races rather than the partial races defined by the surfaces 30 and 38 which extend only approximately through a quadrant. The member 48 of the inner race assembly 47 includes an outwardly divergent end portion 52 adapted to be received in a complementary recess in the adjacent face of the other member 49 of the race assembly, with contraction of the end portion 52 being permitted through the inclusion of slots 53 in the end of the member 48. The inner race assembly 47 may be used wherever a full inner bearing race is required in mounting a rotatable member. As before, the existence of an axle shaft through the axial opening 54 prevents separation of the members 48 and 49 because the end portion 52 cannot be contracted when the axle shaft is in place.

Figure 5:
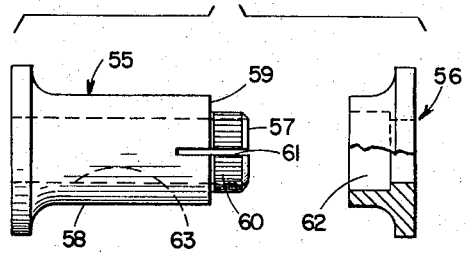
FIGURE 5 is an exploded side elevational view, partially broken away, of a modified inner race assembly in which a knurled portion on one member fits in the socket in the other.
Figure 2:
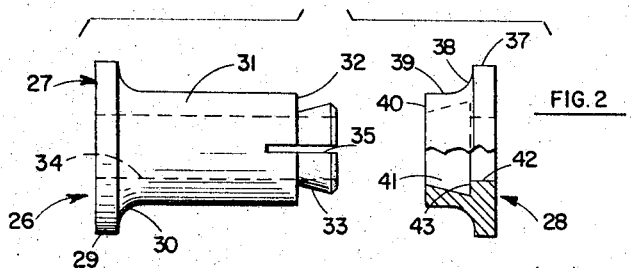
FIGURE 2 is an exploded side elevational view, partially broken away, of the elements of the inner race assembly of the bearing of FIGURE 1.
Figure 3:
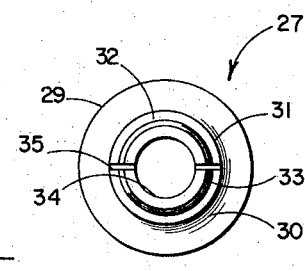
FIGURE 3 is an end elevational view of one of the members of the inner race assembly.

In the modification of FIGURE 5, the members 55 and 56 for making up the bearing race assembly are of the same general type as that of FIGURES 1 and 2. The member 55 includes an end section 57, smaller than the main cylindrical portion 58, that extends axially outwardly from the radial end wall 59. The end 57 is generally cylindrical and is provided with a straight knurl 60 extending longitudinally along its periphery. Longitudinally inwardly extending slots 61 permit contraction of the end portion 57 of the member 55 so that it can enter the axially inwardly extending cylindrical recess 62 in the member 56. The diameter of the circumferential wall of the recess 62 is slightly less than the outer diameter of the knurled end portion 57 in its free position. Consequently, when the knurled end 57 has entered the recess 62, it will tend to spring outwardly, forcing the knurled surface tightly against the wall of the recess. The teeth formed by the knurl will dig into the circumferential surface of the recess, thereby increasing the retaining force. Thus, in this design as before, there is a strong retention between the two mating sections of the inner race assembly once they have been assembled together. Also, the axial opening 63 can receive an axle shaft or other element which then will prevent contraction of the end section 57 and preclude its withdrawal from the opening 62.

Figure 6:
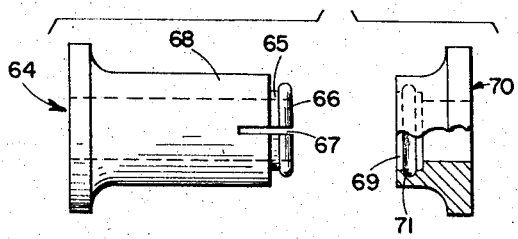
FIGURE 6 is an exploded side elevational view, partially broken away, of a further modification where an annular bead on one race element fits in a groove in the socket in the other.

In FIGURE 6, the longer inner race element 64 includes an end section 65 having an enlarged rounded annular bead 66 at its outer end. The usual longitudinally extending slots 67 are provided, extending inwardly past the end section 65 and into the cylindrical part 68 of the member 64. The end section 65 is adapted to fit within a recess 69 in the other inner race member 70 when the bearing race assembly is completed. The recess 69 includes an annular convex groove 71, which is adapted to receive the rounded bead 66 when the parts are assembled. When the bead 66 fits in the groove 71, there is a positive lock that securely holds the members 64 and 70 together.

Figure 7:
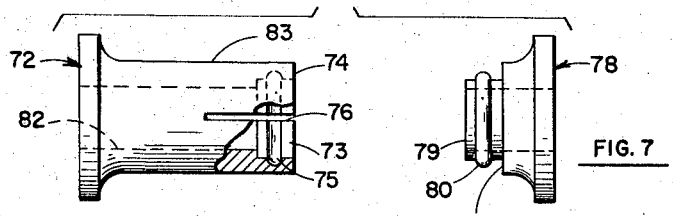
FIGURE 7 is an exploded side elevational view, partially broken away, of an additional modification in which the slots are provided in the member having the socket.

FIGURE 7 illustrates a different form of the invention in which the slotted part constitutes the female section of the coupling, rather than the slots being provided in the male portion as in the previously described arrangements. Here, the inner race element 72 includes a recess 73 extending inwardly from its outer end wall 74. The recess 73 includes a rounded annular groove 75 similar to the groove 71 of the embodiment of FIGURE 6. Opposed slots 76 extend longitudinally inwardly of the end surface 74 past the recess 73.

The shorter inner race element 78 includes an end section 79 having an enlarged rounded annular bead 80 on its periphery outwardly of the radial wall 81. The members 72 and 78 are assembled to position the end portion 79 of the member 78 within the recess 73. When this occurs, the bead 80 fits within the groove 75 to lock the two members together. Assembly is accomplished by springing the end portion of the member 72 outwardly as permitted by the slots 76. Thus, the opening for the recess 73 is enlarged to permit bead 80 to pass through the smaller diameter portion and then enter the groove 75. With the bead 80 in the groove 75, the outward force on the member 72 is released and the parts are held together. This construction does not provide the positive assurance of retention from the existence of an axle shaft in the axial passageway 82 through the inner race as occurs in the other designs. In other words, an axle shaft in the opening 82 would not prevent the member 72 from being sprung outwardly adjacent the end wall 74, in which event the end portion 79 of the member 78 could escape from the recess 73. However, normally the service conditions are not sufficiently severe to prevent satisfactory and reliable performance from the inner race construction of FIGURE 7. Also, it may be noted that this type of design is particularly adapted for a situation where the cylindrical portion 83 may be fitted within a cylindrical opening substantially complementary to it, in which event the positive retention feature would result. When received within such a cylindrical opening, the member 72 cannot be sprung outwardly adjacent the end wall 74, so that the end 79 of the member 78 will not be allowed to come out of the recess 73. This permits a manual assembly operation by sliding the long female race 72 shown in FIGURE 7 on the shaft, then other components, then short male race 18, followed by a nut on the end of the axle shaft to compress, snap-in, and lock the parts together.

While described as an inner race assembly for a dual ball bearing, the unit provided by this invention also is usable for roller or needle bearings, or outside of the bearing field as a fastener. For roller and needle bearings, the inner race assembly may provide support for a single set of rollers about its periphery, rather than two sets as for the dual ball bearings described above. The rollers will extend between the two flanges at the ends of the race assembly, and there need be no curved surfaces between the circumference of the race and the flanges.

From the foregoing it may be seen that I have provided an improved bearing race arrangement which is capable of various modifications, yet which in all instances retains the advantages of ease of assembly and simple construction. Also, the device provides a bearing assembly of durable construction that assures retention of the balls at the races under service conditions.

The foregoing detailed description is to be clearly understood as given by way of illustration and example only, the spirit and scope of this invention being limited solely by the appended claims.

I claim:
1. An inner bearing race assembly comprising
   a first member,
   and a second member in an axially aligned relationship,
   said members having adjacent ends, each of said members having an annular exterior surface for engagement with a plurality of bearing members, said first member having a socket in said end thereof,
   said second member having an extending portion at said end thereof received in said socket and retained thereby,
   one of said members having inwardly extending slot means at said end thereof for permitting a thickness change to facilitate entry of said extending portion into said socket, the other of said members at said end thereof having a continuous annular wall.

2. In combination with a rotatable member, said member having an opening therethrough, a bearing for said member comprising
   a duality of outer bearing races in said opening,
   said races being axially spaced apart,
   a set of balls for each of said races, and an inner race assembly,
   said inner race assembly including a first member and a second member,
   said first member including an inner race for one of said sets of balls,
   said second member including an inner race for the other of said sets of balls,
   said first and second members having aligned axial openings therethrough,
   said first and second members having adjacent ends,
   said first member having a socket in said adjacent end thereof,
   said adjacent end of said second member having a portion received in said socket for holding said members together,
   one of said members at said socket and extending inwardly thereof having slot means for permitting a thickness change of said member for permitting entry of said end portion into said socket and for retaining said portion therein, the other of said members at said adjacent end having a continuous circumferential wall.

3. In combination with a rotatable member, a means for rotatably mounting said member comprising
   a duality of axially aligned, axially spaced outer races engaging said member,
   a set of balls for each of said races, an inner race assembly,
   said inner race assembly comprising a first member and a second member,
   said first member having an inner race for one of said sets of balls,
   said second member having an inner race for the other of said sets of balls,
   said first member having an end wall and a socket extending axially inwardly thereof, said first member having a continuous circumferential wall at said socket,
   said first member having a continuous circumferential wall at said socket,
   said second member having an end wall and a reduced diameter portion extending axially outwardly from said end wall of said second member,
   said portion of said second member being received in said socket,
   said members having aligned axial openings therethrough,
   said second member having longitudinally extending slots extending inwardly from said reduced diameter portion for permitting reduction in thickness of said portion to facilitate entry of said portion into said socket and retention thereof within said socket,
   and an axle shaft extending through said aligned openings in said first and second members.

4. A device as recited in claim 3 in which said reduced diameter portion of said second member is provided with a longitudinally extending knurl on the circumferential surface thereof.

5. A device as recited in claim 3 in which said socket includes an enlarged portion inwardly of said end wall of said first member, and in which said reduced diameter portion of said second member includes an enlarged portion outwardly of said end wall of said second member received in said enlarged portion of said socket of said first member.

6. A device as recited in claim 5 in which for said enlarged portion
   said socket is of substantially frustoconical configuration with the apical portion thereof adjacent said end wall of said first member, and in which for providing said enlarged portion on reduced diameter portion of said second member,
   said reduced diameter portion of said second member is substantially frustoconical in configuration with the apical portion adjacent said end wall of said second member, said end portion being substantially complementarily received in said socket.

7. A device as recited in claim 3 in which said socket in said second member inwardly of said end wall of said second member includes an annular groove, and in which said reduced diameter portion of said second member outwardly of said end wall of said second member includes an annular bead received in said annular groove for thereby locking said second member to said first member.

8. A device as recited in claim 3, in which said first and second members have aligned cylindrical exterior surfaces of substantially the same diameter, and said aligned axial openings are of uniform diameter and substantially complementarily receive said axle shaft.

References Cited

UNITED STATES PATENTS

| | | | |
|---|---|---|---|
| 1,093,348 | 4/1914 | Mooers | 308—195 |
| 1,543,135 | 6/1925 | Vincon | 308—196 |
| 2,105,354 | 1/1938 | Hoerle | 308—195 |
| 2,129,167 | 9/1938 | Cunnington | 308—191 |

CARLTON R. CROYLE, *Primary Examiner.*

FRANK SUSKO, *Examiner.*